(12) United States Patent
Takahashi et al.

(10) Patent No.: US 11,431,949 B2
(45) Date of Patent: Aug. 30, 2022

(54) IMAGE PROCESSING APPARATUS, IMAGE PROCESSING METHOD, AND PROGRAM

(71) Applicant: SONY GROUP CORPORATION, Tokyo (JP)

(72) Inventors: Noriaki Takahashi, Tokyo (JP); Haruka Mitsumori, Tokyo (JP); Yuto Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/434,795

(22) PCT Filed: Feb. 26, 2020

(86) PCT No.: PCT/JP2020/007591
§ 371 (c)(1),
(2) Date: Aug. 30, 2021

(87) PCT Pub. No.: WO2020/184173
PCT Pub. Date: Sep. 17, 2020

(65) Prior Publication Data
US 2022/0141437 A1    May 5, 2022

(30) Foreign Application Priority Data

Mar. 11, 2019   (JP) .............................. JP2019-043752

(51) Int. Cl.
*H04N 9/31*   (2006.01)
*H04N 5/247*   (2006.01)
(Continued)

(52) U.S. Cl.
CPC ......... *H04N 9/3194* (2013.01); *G06T 7/0002* (2013.01); *H04N 5/247* (2013.01);
(Continued)

(58) Field of Classification Search
CPC .... H04N 9/3194; H04N 9/3185; H04N 5/247; H04N 17/002; G06T 7/0002; G06T 2207/30168
See application file for complete search history.

(56) References Cited

U.S. PATENT DOCUMENTS 6,219,099 B1 *   4/2001   Johnson ................... H04N 9/12
                                                     348/E17.005
6,618,076 B1 *   9/2003   Sukthankar ............ H04N 17/04
                                                     348/E17.005
(Continued)

FOREIGN PATENT DOCUMENTS

CN   107409192 A   11/2017
CN   110313176 A   10/2019
(Continued)

OTHER PUBLICATIONS

International Search Report and Written Opinion of PCT Application No. PCT/JP2020/007591, dated May 26, 2020, 08 pages of ISRWO.

*Primary Examiner* — Brian P Yenke
(74) *Attorney, Agent, or Firm* — Chip Law Group

(57) ABSTRACT

The present technology relates to an image processing apparatus, an image processing method, and a program that allow an improvement in measurement accuracy by taking into account degradation occurring during projection and degradation occurring during imaging.
An image processing apparatus according to an aspect of the present technology performs, on a test pattern image representing a predetermined test pattern, correction according to an imaging degradation model obtained by modeling degradation occurring during capturing of the test pattern image projected on a screen, and correction according to a projection degradation model obtained by modeling degradation occurring during projection of the test pattern image. The
(Continued)

present technology can be applied to an image processing apparatus that controls projection by a projector.

19 Claims, 11 Drawing Sheets

(51) Int. Cl.
  *H04N 17/00* (2006.01)
  *G06T 7/00* (2017.01)
(52) U.S. Cl.
  CPC ......... *H04N 9/3185* (2013.01); *H04N 17/002* (2013.01); *G06T 2207/30168* (2013.01)

(56) References Cited

U.S. PATENT DOCUMENTS

| | | | |
|---|---|---|---|
| 8,355,601 B2* | 1/2013 | Ding | H04N 9/3182 382/199 |
| 10,319,111 B2* | 6/2019 | Kaji | G06T 5/006 |
| 10,638,104 B2* | 4/2020 | Morris | H04N 9/3185 |
| 10,798,353 B2* | 10/2020 | Matsuzawa | H04N 9/3185 |
| 10,992,929 B2* | 4/2021 | Tseng | H04N 17/002 |
| 11,223,808 B1* | 1/2022 | Faragher | H04N 9/3182 |
| 2011/0176007 A1* | 7/2011 | Ding | H04N 9/3194 348/189 |
| 2017/0294009 A1* | 10/2017 | Pollard | G06T 7/80 |
| 2018/0082406 A1 | 3/2018 | Suzuki et al. | |
| 2018/0247601 A1 | 8/2018 | Chen et al. | |
| 2019/0052851 A1* | 2/2019 | Korl | H04N 5/247 |
| 2019/0313070 A1* | 10/2019 | Boujut-Burgun | G06T 1/20 |
| 2021/0051305 A1* | 2/2021 | Takahashi | G09G 5/00 |

FOREIGN PATENT DOCUMENTS

| | | |
|---|---|---|
| JP | 2014-119442 A | 6/2014 |
| WO | 2016/157670 A1 | 10/2016 |
| WO | 2016/157671 A1 | 10/2016 |
| WO | 2018/155269 A1 | 8/2018 |

* cited by examiner

IMAGE PROCESSING APPARATUS, IMAGE PROCESSING METHOD, AND PROGRAM

CROSS REFERENCE TO RELATED APPLICATIONS

This application is a U.S. National Phase of International Patent Application No. PCT/JP2020/007591 filed on Feb. 26, 2020, which claims priority benefit of Japanese Patent Application No. JP 2019-043752 filed in the Japan Patent Office on Mar. 11, 2019. Each of the above-referenced applications is hereby incorporated herein by reference in its entirety.

TECHNICAL FIELD

The present technology relates to an image processing apparatus, an image processing method, and a program, and more particularly, to an image processing apparatus, an image processing method, and a program capable of improving measurement accuracy by taking into account degradation occurring during projection and degradation occurring during imaging.

BACKGROUND ART

There is a so-called projector camera system in which an image projected by a projector is captured by a camera, and the projection image is corrected using a captured image, for a reduction in distortion, alignment, etc. of the projection image. By performing corresponding point detection to detect points in the captured image corresponding one-to-one to points on the projection image, parameters to be used in correction of the projection image are determined.

In order for such a projector camera system to accurately perform measurement such as corresponding point detection, it is necessary to correct degradation occurring during projection and degradation occurring during imaging, for which calibration is performed.

Generally, the calibration of the projector and the calibration of the camera are performed independently. That is, degradation occurring at the projector during projection is improved by calibration at the projector. Also, degradation occurring at the camera during capturing of a projection image is improved by calibration at the camera.

For example, Patent Document 1 discloses a technique for improving measurement accuracy by determining reliability with a noise model during measurement taken into account.

CITATION LIST

Patent Document

Patent Document 1: Japanese Patent Application Laid-Open No. 2014-119442

SUMMARY OF THE INVENTION

Problems to be Solved by the Invention

An attempt to correct a captured image by image processing as calibration at the camera does not lead to an improvement in measurement accuracy because the S/N ratio of a signal of the captured image does not change.

In addition, an adjustment by controlling the optical system at the camera results in correction on the entire screen, thus causing harmful effects on portions having no problems. For example, in the case of adjusting dimming at the camera by exposure control, an adjustment of the aperture and sensitivity in accordance with a dark portion in a captured image can saturate bright portions, causing errors in measurement results.

The present technology has been made in view of such circumstances, and is intended to improve measurement accuracy by taking into account degradation occurring during projection and degradation occurring during imaging.

Solutions to Problems

An image processing apparatus according to one aspect of the present technology includes a correction processing unit that performs, on a test pattern image representing a predetermined test pattern, correction processing according to an imaging degradation model obtained by modeling degradation occurring during capturing of the test pattern image projected on a screen, and correction processing according to a projection degradation model obtained by modeling degradation occurring during projection of the test pattern image.

An image processing apparatus according to another aspect of the present technology includes a first correction processing unit that performs, on a structured light pattern image representing a structured light pattern to be combined with an input image, correction processing according to an imaging degradation model obtained by modeling degradation occurring during capturing of the input image projected on a screen, a combining unit that generates the input image combined with the structured light pattern image by alternately combining a positive image and a negative image of the structured light pattern image that has undergone the correction processing according to the imaging degradation model, with individual consecutive frames constituting the input image, and a second correction processing unit that performs, on the input image combined with the structured light pattern image, correction processing according to a projection degradation model obtained by modeling degradation occurring during projection of the input image.

In the one aspect of the present technology, the test pattern image representing the predetermined test pattern undergoes the correction processing according to the imaging degradation model obtained by modeling degradation occurring during capturing of the test pattern image projected on the screen, and the correction processing according to the projection degradation model obtained by modeling degradation occurring during projection of the test pattern image.

In the another aspect of the present technology, the structured light pattern image representing the structured light pattern to be combined with the input image undergoes the correction processing according to the imaging degradation model obtained by modeling degradation occurring during capturing of the input image projected on the screen, and the input image combined with the structured light pattern image is generated by alternately combining the positive image and the negative image of the structured light pattern image that has undergone the correction processing according to the imaging degradation model, with the individual consecutive frames constituting the input image. Furthermore, the input image combined with the structured light pattern image undergoes the correction processing according to the projection degradation model obtained by modeling degradation occurring during projection of the input image.

MODE FOR CARRYING OUT THE INVENTION

Hereinafter, an embodiment for implementing the present technology will be described. The description will be made in the following order.

1. Preconditions for projector camera system
2. Projector camera system to which the present technology is applied
3. Example of configuration with multiple pieces
4. Example of ISL method
5. Modification <<Preconditions for Projector Camera System>>

Figure 1:
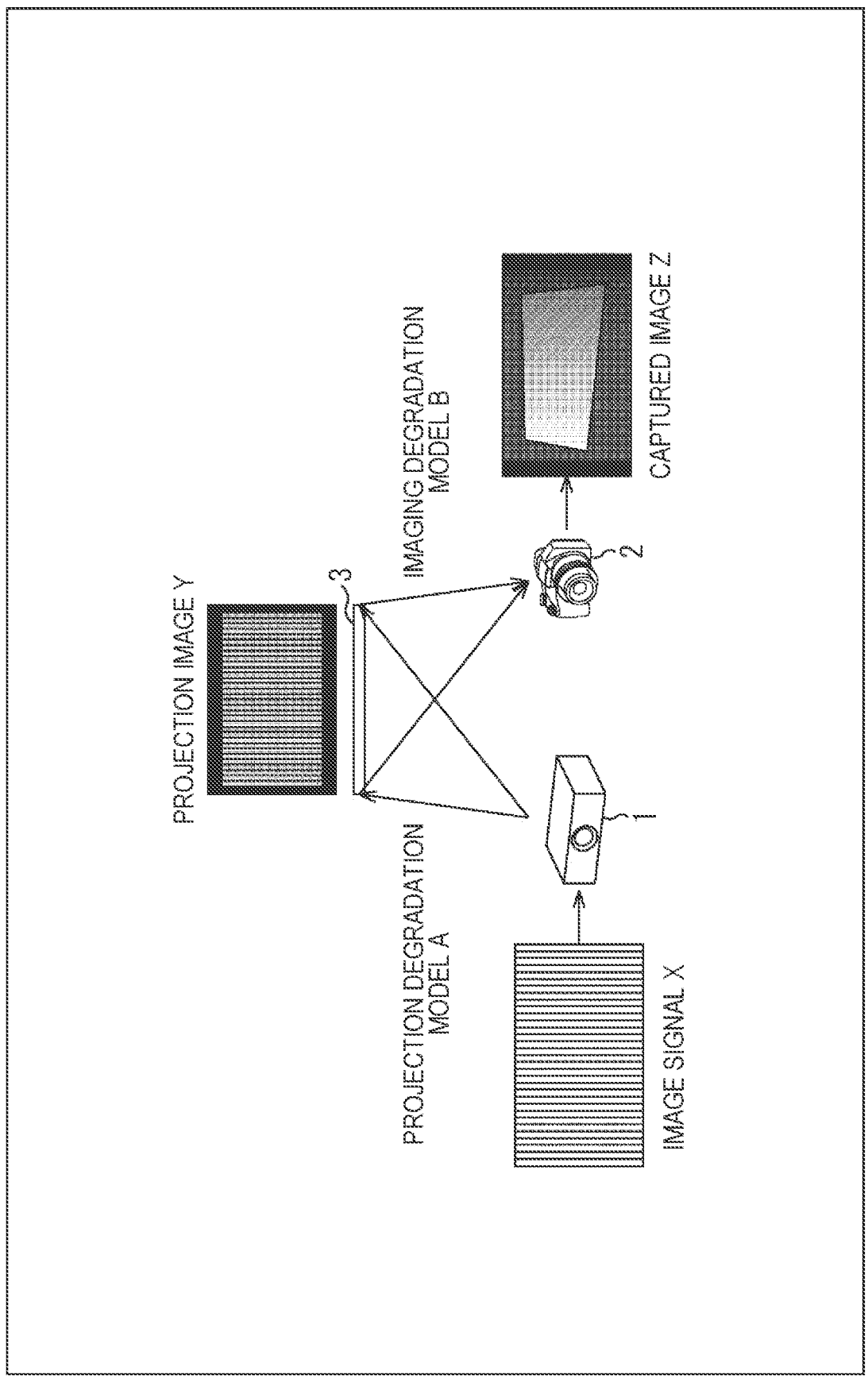
FIG. 1 is a diagram illustrating an example of a measurement model in a projector camera system.

FIG. 1 is a diagram illustrating an example of a measurement model in a projector camera system.

The projector camera system in FIG. 1 is provided with a projector 1 and a camera 2. A screen 3 serving as a projection surface is provided in front of the projector 1.

The camera 2 is provided near the projector 1. However, the projector 1 and the camera 2 may be composed of devices in the same housing. Furthermore, the camera 2 may be provided at a position away from the projector 1.

An image signal X representing a test pattern is input as an input to the projector 1.

Projection light emitted from the projector 1 is observed as a projection image Y on the screen 3. The projection image Y contains degradation caused during projection.

A projection degradation model A obtained by modeling degradation during projection is described as a transfer function according to the characteristics of the projector 1, the characteristics of the screen 3, and disturbances in the surrounding environments. For example, the characteristics of the projector 1 include the brightness of the light source and the characteristics of the lens. The surrounding environments include surrounding brightness etc.

The projection image Y can be expressed by the following equation (1).

[Equation 1]

$$Y = A \cdot X \qquad (1)$$

On the other hand, the camera 2 captures the projection image Y projected on the screen 3 to acquire a captured image Z. The captured image Z contains degradation caused during imaging.

An imaging degradation model B obtained by modeling degradation during imaging is described as a transfer function according to the characteristics of the camera 2. The imaging degradation model B is determined by the conditions of imaging parameters during imaging, such as ISO sensitivity, shutter speed, and aperture.

The captured image Z can be expressed by the following equation (2).

[Equation 2]

$$\begin{aligned} Z &= B \cdot Y \\ &= B \cdot A \cdot X \end{aligned} \qquad (2)$$

Thus, the projection degradation model A and the imaging degradation model B are superposed (degradation corresponding to the degradation models is superposed) on the image signal X acquired at the camera 2.

<<Projector Camera System to Which the Present Technology is Applied>>

<About Pre-Correction Processing>

Figure 2:
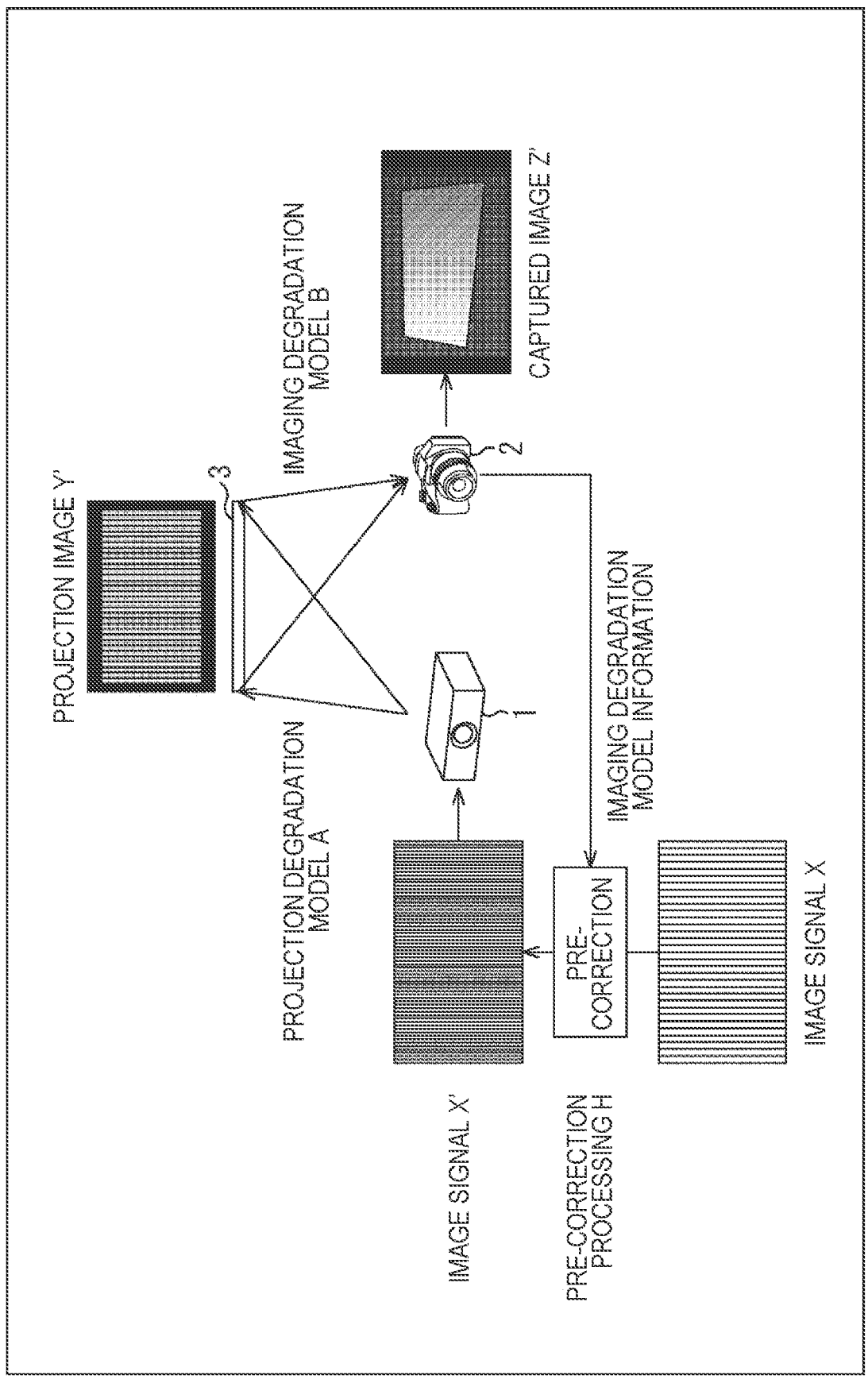
FIG. 2 is a diagram illustrating a configuration example of a projector camera system according to an embodiment of the present technology.

FIG. 2 is a diagram illustrating a configuration example of a projector camera system according to an embodiment of the present technology.

The same reference numerals are assigned to components illustrated in FIG. 2 corresponding to the components described with reference to FIG. 1. Duplicated explanation will be omitted as appropriate.

As illustrated in FIG. 2, in the projector camera system according to the embodiment of the present technology, imaging degradation model information that is information indicating the imaging degradation model B is provided from the camera 2 to the projector 1. The projector 1 performs pre-correction processing H in which the inverse correction of not only the projection degradation model A but also the imaging degradation model B is applied to the image signal X.

The pre-correction processing H can be expressed by the following equation (3) as pre-correction (inverse correction) processing of the projection degradation model A and the imaging degradation model B. The pre-correction processing H uses an inverse matrix of the projection degradation model A and an inverse matrix of the imaging degradation model B.

[Equation 3]

$$H = A^{-1} \cdot B^{-1} \qquad (3)$$

By the pre-correction processing H, an image signal X' is generated. The image signal X' can be expressed by the following equation (4).

[Equation 4]

$$X' = A^{-1} \cdot B^{-1} \cdot X \qquad (4)$$

Projection based on the image signal X' is performed by the projector 1, and a projection image Y' is projected on the screen 3.

From the above equation (1), the projection image Y' can be expressed by the following equation (5).

[Equation 5]

$$\begin{aligned} Y' &= A \cdot A^{-1} \cdot B^{-1} \cdot X \\ &= B^{-1} \cdot X \end{aligned} \qquad (5)$$

The projection image Y' is captured by the camera 2, and a captured image Z' is acquired.

From the above equation (2), the captured image Z' acquired by the camera 2 can be expressed by the following equation (6).

[Equation 6]

$$Z' = B \cdot A \cdot A^{-1} \cdot B^{-1} \cdot X \quad (6)$$
$$= X$$

Equation (6) represents that the same image as the image represented by the image signal X can be acquired at the camera 2 as the captured image Z'. Thus, by the pre-correction processing H, both the projection degradation model A and the imaging degradation model B can be compensated.

<Configuration of Projector Camera System>

Figure 3:
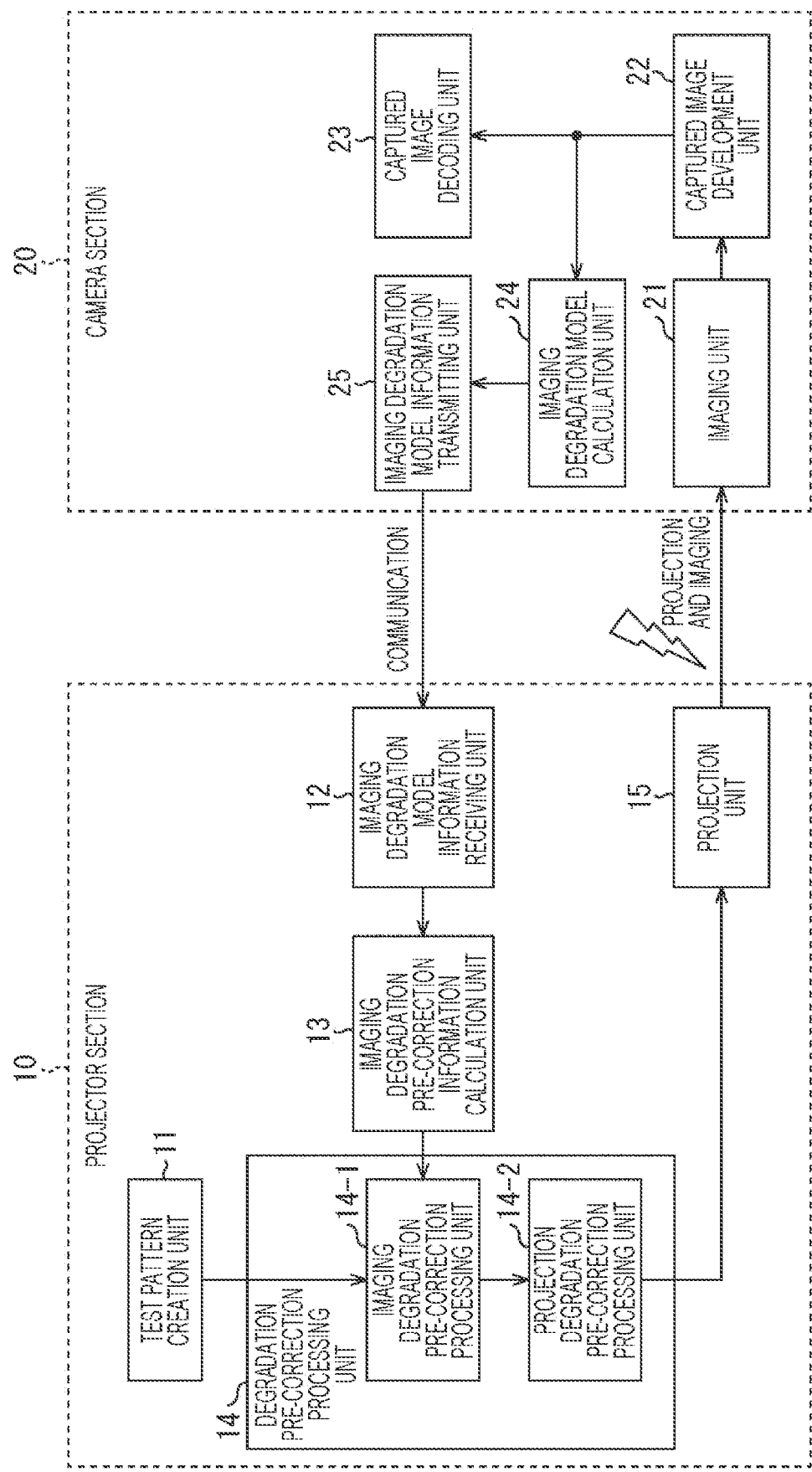
FIG. 3 is a block diagram illustrating a configuration example of the projector camera system.

FIG. 3 is a block diagram illustrating a configuration example of the projector camera system in FIG. 2.

As illustrated in FIG. 3, the projector camera system includes a projector section 10 and a camera section 20.

The projector section 10 includes a test pattern creation unit 11, an imaging degradation model information receiving unit 12, an imaging degradation pre-correction information calculation unit 13, a degradation pre-correction processing unit 14, and a projection unit 15. The degradation pre-correction processing unit 14 includes an imaging degradation pre-correction processing unit 14-1 and a projection degradation pre-correction processing unit 14-2.

At least part of the configuration of the projector section 10 is implemented at the projector 1 by a computer mounted on the projector 1 executing a predetermined program. As will be described later, at least part of the configuration of the projector section 10 may be implemented at an apparatus such as a PC external to the projector 1.

The test pattern creation unit 11 creates a test pattern image representing a test pattern and outputs it to the imaging degradation pre-correction processing unit 14-1. As the test pattern, a predetermined pattern such as a pattern of slits or checks is used. The test pattern image corresponds to the image signal X.

The imaging degradation model information receiving unit 12 performs communication with the camera 2. The projector 1 is provided with a communication module that performs wireless or wired communication with the camera 2. The imaging degradation model information receiving unit 12 receives and acquires the imaging degradation model information indicating the imaging degradation model B transmitted from the camera section 20, and outputs it to the imaging degradation pre-correction information calculation unit 13.

The imaging degradation pre-correction information calculation unit 13 calculates parameters to be used in the correction of degradation during imaging, on the basis of the imaging degradation model information provided from the imaging degradation model information receiving unit 12, and outputs them to the imaging degradation pre-correction processing unit 14-1. The parameters calculated by the imaging degradation pre-correction information calculation unit 13 are parameters representing the inverse correction ($B^{-1}$) of the imaging degradation model B.

The imaging degradation pre-correction processing unit 14-1 generates an image signal obtained by applying the inverse correction of the imaging degradation model B to the test pattern image (image signal X) provided from the test pattern creation unit 11. The image signal generated by the application of the inverse correction of the imaging degradation model B based on the parameters provided from the imaging degradation pre-correction information calculation unit 13 is provided to the projection degradation pre-correction processing unit 14-2.

The projection degradation pre-correction processing unit 14-2 generates an image signal obtained by applying the inverse correction ($A^{-1}$) of the projection degradation model A of the projector 1 itself to the image signal provided from the imaging degradation pre-correction processing unit 14-1. Information regarding the projection degradation model A is set to the projection degradation pre-correction processing unit 14-2.

The image signal generated by the projection degradation pre-correction processing unit 14-2 is the image signal X' (equation (4)). That is, the pre-correction processing H is performed in the degradation pre-correction processing unit 14. The image signal X' generated by the application of the inverse correction of the projection degradation model A is provided to the projection unit 15. A corrected image obtained by performing the pre-correction processing on the test pattern image corresponds to the image signal X'.

The projection unit 15 performs projection on the basis of the image signal X' provided from the projection degradation pre-correction processing unit 14-2. The projection image Y' is projected on the screen 3.

Furthermore, the camera section 20 includes an imaging unit 21, a captured image development unit 22, a captured image decoding unit 23, an imaging degradation model calculation unit 24, and an imaging degradation model information transmitting unit 25. At least part of the configuration of the camera section 20 is implemented at the camera 2 by a computer mounted on the camera 2 executing a predetermined program.

The imaging unit 21 captures a projection image projected on the screen 3, and outputs an image signal to the captured image development unit 22.

The captured image development unit 22 develops the image signal provided from the imaging unit 21 (converts a RAW signal into an RGB signal), to generate a developed image signal. The developed image signal is output to the captured image decoding unit 23 and the imaging degradation model calculation unit 24. The developed image signal corresponds to the captured image Z'.

The captured image decoding unit 23 performs predetermined processing such as corresponding point detection on the basis of the image signal provided from the captured image development unit 22, to acquire sensing information. The sensing information is coordinate information indicating at what position each point in the test pattern image appears in the captured image.

The imaging degradation model calculation unit 24 calculates the imaging degradation model B on the basis of the image signal provided from the captured image development unit 22. Parameters representing the imaging degradation model B are provided to the imaging degradation model information transmitting unit 25.

The imaging degradation model information transmitting unit 25 transmits the parameters representing the imaging degradation model B provided from the imaging degradation model calculation unit 24 to the projector section 10 as the imaging degradation model information.

<Operation of Projector Camera System>

With reference to a flowchart in FIG. 4A, a series of correction processing steps in the projector section 10 having the above configuration will be described.

In step S1, the test pattern creation unit 11 creates a test pattern image X (image signal X) for the pre-correction processing.

In step S2, the imaging degradation pre-correction processing unit 14-1 performs imaging degradation pre-correction processing. By the imaging degradation pre-correction processing, the inverse correction of the imaging degradation model B is applied to the test pattern image X. Details of the imaging degradation pre-correction processing will be described later with reference to a flowchart in FIG. 5. After the imaging degradation pre-correction processing, the processing proceeds to step S3.

In step S3, the projection degradation pre-correction processing unit 14-2 performs projection degradation pre-correction processing. The inverse correction of the projection degradation model A is further applied to the test pattern image X to which the inverse correction of the imaging degradation model B has been applied by the imaging degradation pre-correction processing. Details of the projection degradation pre-correction processing will be described later with reference to a flowchart in FIG. 6. After the projection degradation pre-correction processing, the processing proceeds to step S4.

In step S4, the projection unit 15 projects a corrected image X' (image signal X') generated by the projection degradation pre-correction processing.

Imaging Degradation Pre-Correction Processing

Next, with reference to the flowchart in FIG. 5, the imaging degradation pre-correction processing performed in step S2 in FIG. 4 will be described.

In step S11, the imaging degradation pre-correction processing unit 14-1 selects a predetermined pixel in the test pattern image X as a pixel of interest i. For example, the pixel of interest i is selected in order from the upper left pixel.

In step S12, the imaging degradation pre-correction processing unit 14-1 selects neighboring pixels k of the pixel of interest i. The neighboring pixels k are selected as pixels in the range of −m to m around the pixel of interest i.

In step S13, the imaging degradation pre-correction processing unit 14-1 reads a pixel value $X_{i+k}$ that is the pixel values of the pixel of interest i and its neighboring pixels k, from the test pattern image X.

In step S14, the imaging degradation pre-correction processing unit 14-1 sets a parameter $D_{k,B}^{-1}$ to be used in imaging degradation pre-correction. The parameter $D_{k,B}^{-1}$ is a parameter corresponding to k in the inverse correction $B^{-1}$ of the imaging degradation model B.

In step S15, the imaging degradation pre-correction processing unit 14-1 calculates an output value $X_{i,B}^{-1}$ of the imaging degradation pre-correction processing. The output value $X_{i,B}^{-1}$ of the imaging degradation pre-correction processing can be expressed by the following equation (7).

[Equation 7]

$$X_{i,B^{-1}} = \sum_{k=-m}^{m} D_{k,B^{-1}} \cdot X_{i+k} \tag{7}$$

In step S16, the imaging degradation pre-correction processing unit 14-1 determines whether or not attention has been paid to all the pixels. If it is determined that there is a pixel to which attention has not yet been paid, the processing returns to step S11, and the above-described processing is repeated until it is determined that attention has been paid to all the pixels.

Figure 4:
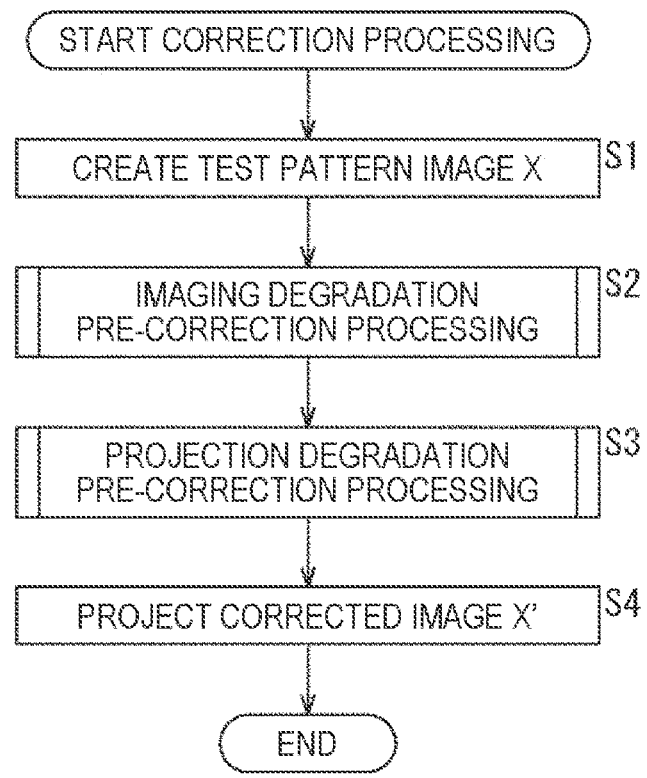
FIG. 4 is a flowchart explaining correction processing.
Figure 5:
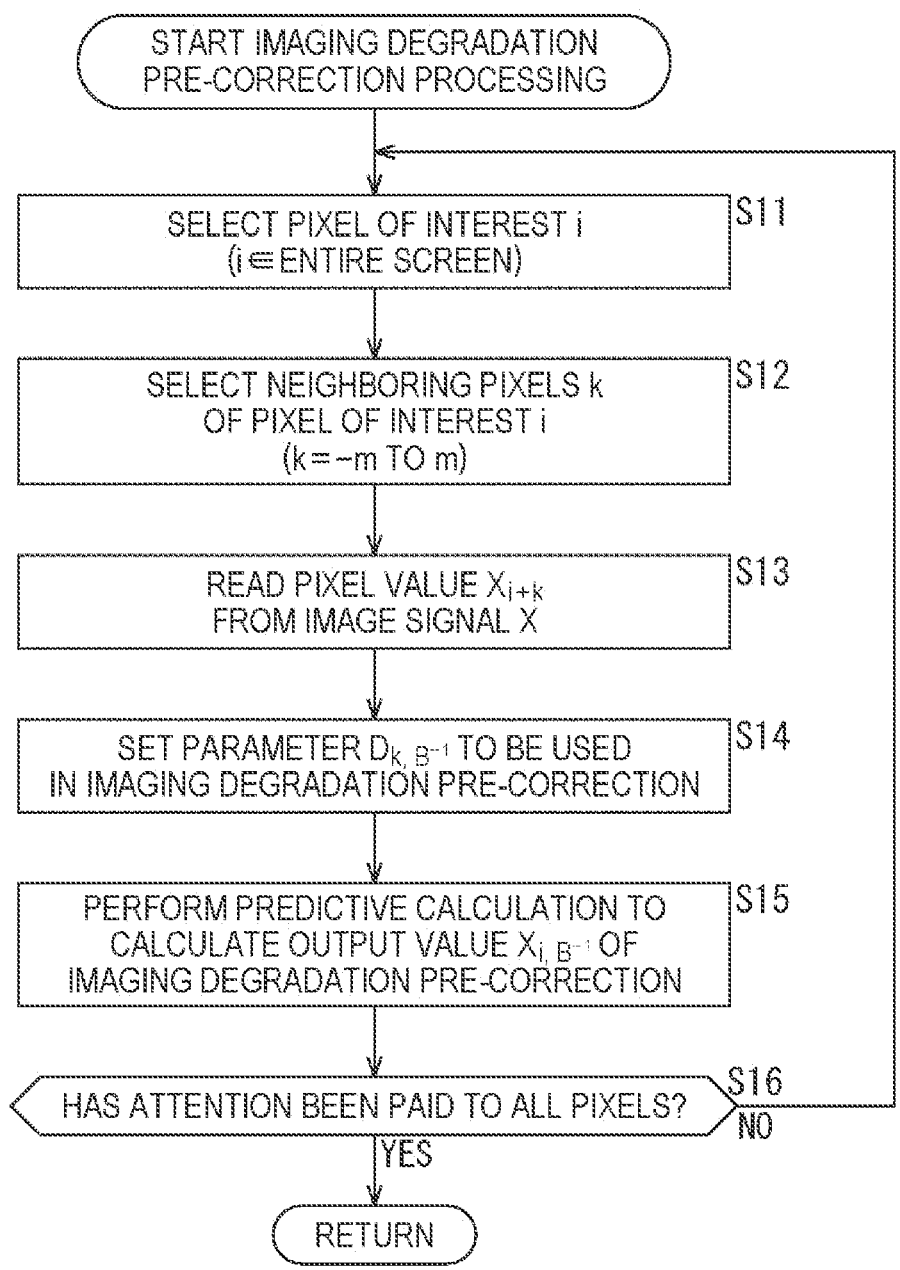
FIG. 5 is a flowchart explaining imaging degradation pre-correction processing in step S2 in FIG. 4.

If it is determined in step S16 that attention has been paid to all the pixels, the processing returns to step S2 in FIG. 4, and the subsequent processing is performed.

Projection degradation pre-correction processing

Figure 6:
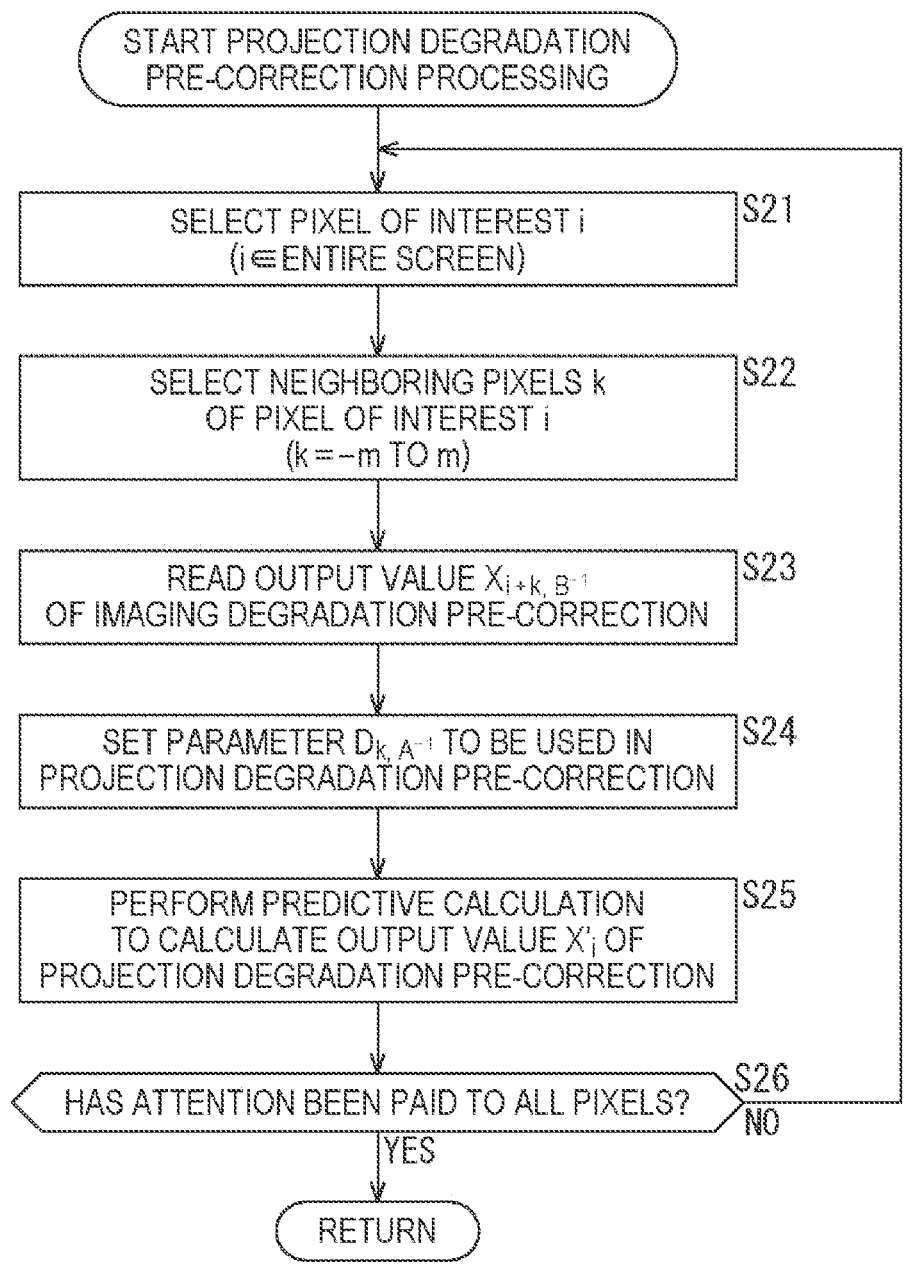
FIG. 6 is a flowchart explaining projection degradation pre-correction processing in step S3 in FIG. 4.

Next, with reference to the flowchart in FIG. 6, the projection degradation pre-correction processing performed in step S3 in FIG. 4 will be described.

In step S21, the projection degradation pre-correction processing unit 14-2 selects a predetermined pixel of the test pattern creation unit 11 as a pixel of interest i. For example, the pixel of interest i is selected in order from the upper left pixel.

In step S22, the projection degradation pre-correction processing unit 14-2 selects neighboring pixels k of the pixel of interest i. The neighboring pixels k are selected as pixels in the range of −m to m around the pixel of interest i.

In step S23, the projection degradation pre-correction processing unit 14-2 reads the output value $X_{i+k,B}^{-1}$ calculated by the imaging degradation pre-correction processing.

In step S24, the projection degradation pre-correction processing unit 14-2 sets a parameter $D_{k,A}^{-1}$ to be used in the projection degradation pre-correction processing. The parameter $D_{k,A}^{-1}$ is a parameter corresponding to k in the inverse correction $A^{-1}$ of the projection degradation model A.

In step S25, the projection degradation pre-correction processing unit 14-2 calculates an output value $X'_i$ of the projection degradation pre-correction processing. The output value $X'_i$ of the projection degradation pre-correction processing can be expressed by the following equation (8).

[Equation 8]

$$X'_i = \sum_{k=-m}^{m} D_{k,A^{-1}} \cdot X_{i+k,B^{-1}} \tag{8}$$

In step S26, the projection degradation pre-correction processing unit 14-2 determines whether or not attention has been paid to all the pixels. If it is determined that there is a pixel to which attention has not yet been paid, the processing returns to step S21, and the above-described processing is repeated until it is determined that attention has been paid to all the pixels.

If it is determined in step S26 that attention has been paid to all the pixels, the processing returns to step S3 in FIG. 4, and the subsequent processing is performed.

Through the above processing, both the projection degradation model A of the projector 1 and the imaging degradation model B of the camera 2 can be compensated in advance at the projector 1.

By projecting a test pattern image in which both the projection degradation model A and the imaging degradation model B have been compensated in advance, a high-resolution captured image with small errors can be obtained at the camera 2. By performing measurement such as corresponding point detection on the basis of the high-resolution captured image, measurement accuracy can be improved.

Since degradation at the camera 2 is corrected in advance at the projector 1, an inexpensive camera with large degradation can be used for measurement.

Imaging can be performed from an angle without reducing measurement accuracy, and thus restriction on the installation of the camera 2 can be eased.

<<Example of Configuration with Multiple Pieces>>

Figure 7:
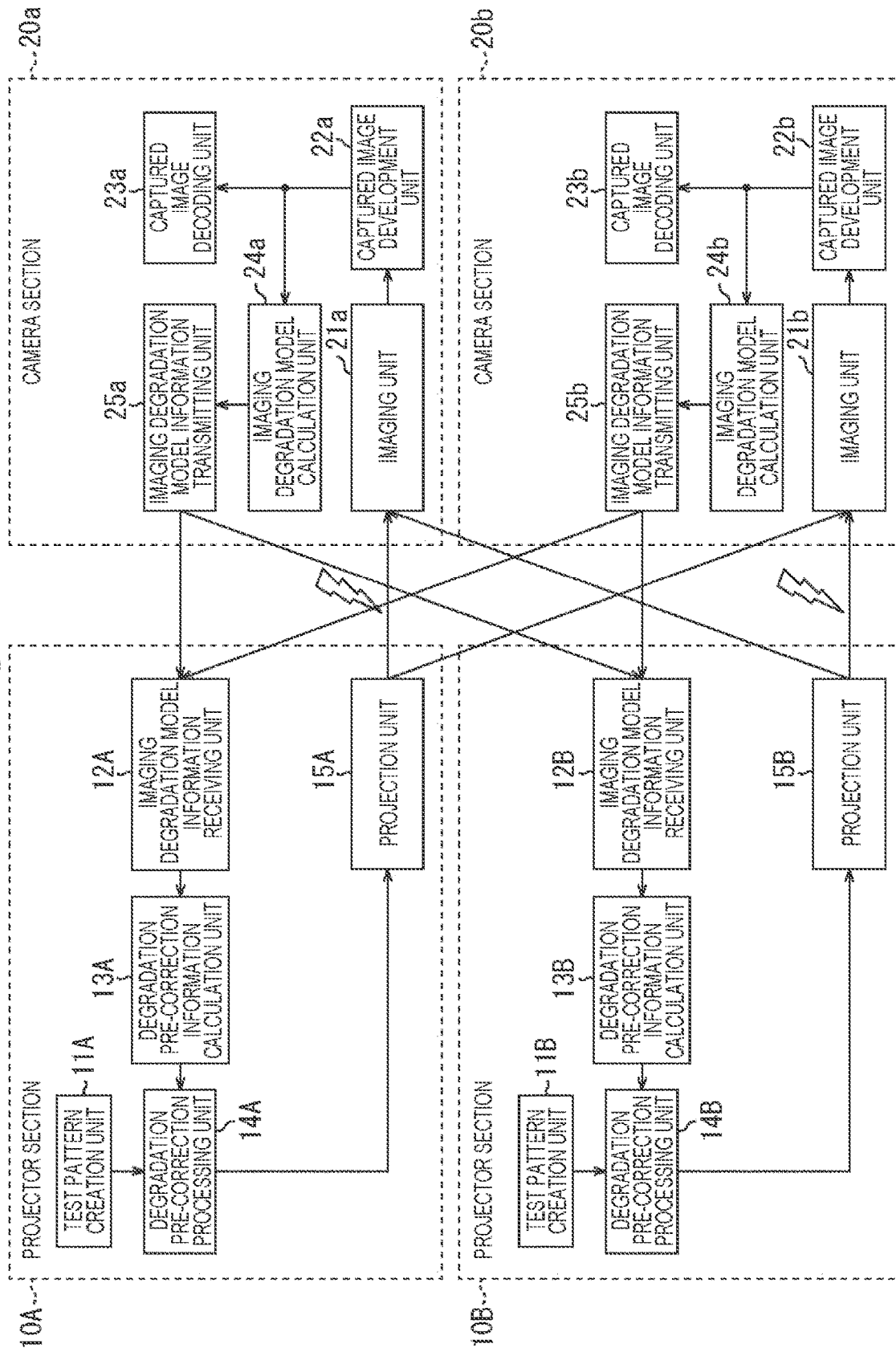
FIG. 7 is a block diagram illustrating another configuration example of the projector camera system.

FIG. 7 is a block diagram illustrating another configuration example of the projector camera system.

As illustrated in FIG. 7, the projector system includes projector sections 10A and 10B and camera sections 20a and 20b. The projector sections 10A and 10B are implemented in a plurality of projectors 1 having different housings. Similarly, the camera sections 20a and 20b are implemented in a plurality of cameras 2 having different housings.

The projector camera system in FIG. 7 is a system that captures images projected from the projectors 1 at each of the cameras 2 and performs measurement.

An image projected by the projector section 10A is captured by both of the camera sections 20a and 20b. An image projected by the projector section 10B is also captured by both of the camera sections 20a and 20b.

Imaging degradation model information indicating an imaging degradation model of the camera section 20a is transmitted from the camera section 20a to both of the projector sections 10A and 10B. Imaging degradation model information indicating an imaging degradation model of the camera section 20b is transmitted from the camera section 20b to both of the projector sections 10A and 10B.

The projector section 10A includes a test pattern creation unit 11A, an imaging degradation model information receiving unit 12A, a degradation pre-correction information calculation unit 13A, a degradation pre-correction processing unit 14A, and a projection unit 15A. The projector section 10B includes a test pattern creation unit 11B, an imaging degradation model information receiving unit 12B, a degradation pre-correction information calculation unit 13B, a degradation pre-correction processing unit 14B, and a projection unit 15B.

The components of the projector sections 10A and 10B have their respective functions similar to those of the test pattern creation unit 11, the imaging degradation model information receiving unit 12, the imaging degradation pre-correction information calculation unit 13, the degradation pre-correction processing unit 14, and the projection unit 15 described with reference to FIG. 3. For example, the imaging degradation model information receiving unit 12 acquires the imaging degradation model information indicating the imaging degradation model B transmitted from each of the camera sections 20a and 20b. Note that in FIG. 7, the imaging degradation pre-correction processing unit 14-1 and the projection degradation pre-correction processing unit 14-2 in FIG. 3 are collectively illustrated as the degradation pre-correction processing units 14A and 14B.

Furthermore, the camera section 20a includes an imaging unit 21a, a captured image development unit 22a, a captured image decoding unit 23a, an imaging degradation model calculation unit 24a, and an imaging degradation model information transmitting unit 25a. The camera section 20b includes an imaging unit 21b, a captured image development unit 22b, a captured image decoding unit 23b, an imaging degradation model calculation unit 24b, and an imaging degradation model information transmitting unit 25b.

The components of the camera sections 20a and 20b have their respective functions similar to those of the imaging unit 21, the captured image development unit 22, the captured image decoding unit 23, the imaging degradation model calculation unit 24, and the imaging degradation model information transmitting unit 25 described with reference to FIG. 3.

In the example of FIG. 7, two projector sections 10 and two camera sections 20 are provided, but three or more projector sections and three or more camera sections may be provided.

In the projector camera system having this configuration, captured images Z' obtained when a projection image from the projector section 10A is captured by each of the camera sections 20a and 20b can be expressed by the following equations (9).

[Equations 9]

$$Z_{A,a}' = B_a \cdot A_A \cdot H_A \cdot X \qquad (9\text{-}1)$$

$$Z_{A,b}' = B_b \cdot A_A \cdot H_A \cdot X \qquad (9\text{-}2)$$

In equations (9), $Z_{A,a}'$ represents the captured image Z' captured by the camera section 20a, and $Z_{A,b}'$ represents the captured image Z' captured by the camera section 20b. $B_a$ represents the imaging degradation model B of the camera section 20a, and $B_b$ represents the imaging degradation model B of the camera section 20b. $A_A$ represents the projection degradation model A of the projector section 10A, and $H_A$ represents the pre-correction processing H performed by the degradation pre-correction processing unit 14A.

An error $e_{A,a}$ between the image signal X and the captured image $Z_{A,a}'$ and an error $e_{A,b}$ between the image signal X and the captured image $Z_{A,b}'$ can be expressed by the following corresponding equations (10).

[Equations 10]

$$e_{A,a} = X - Z_{A,a}' \qquad (10\text{-}1)$$

$$e_{A,b} = X - Z_{A,b}' \qquad (10\text{-}2)$$

The pre-correction processing HA in the projector section 10A can be set so as to minimize the sum of squares of the errors $e_{A,a}$ and $e_{A,b}$. In this case, the pre-correction processing $H_A$ can be expressed by the following equation (11).

[Equation 11]

$$H_A = \operatorname{argmin}(\|e_{A,A}\|_2 + \|e_{A,b}\|_2) \qquad (11)$$

From the above equation (11), an image signal $X_A'$ can be expressed by the following equation (12).

[Equation 12]

$$X_A' = H_A \cdot X \qquad (12)$$

A calculation expressed by the above equation (11) is performed by the degradation pre-correction information calculation unit 13A. Parameters representing the pre-correction processing HA determined by the calculation by the degradation pre-correction information calculation unit 13A are set in the degradation pre-correction processing unit 14A and used in the pre-correction processing expressed by equation (12).

Thus, in the degradation pre-correction processing unit 14A, the pre-correction processing according to the respective imaging degradation models $B_a$ and $B_b$ of the plurality of cameras and the projection degradation model $A_A$ of the projector section 10A itself is performed on the test pattern image.

The calculation of the pre-correction processing $H_A$ and the correction of the test pattern image X using the pre-correction processing $H_A$ in the projector section 10A are calculated as described above. Similar processing is performed in the projector section 10B.

<<Example of ISL method>>

Figure 8:
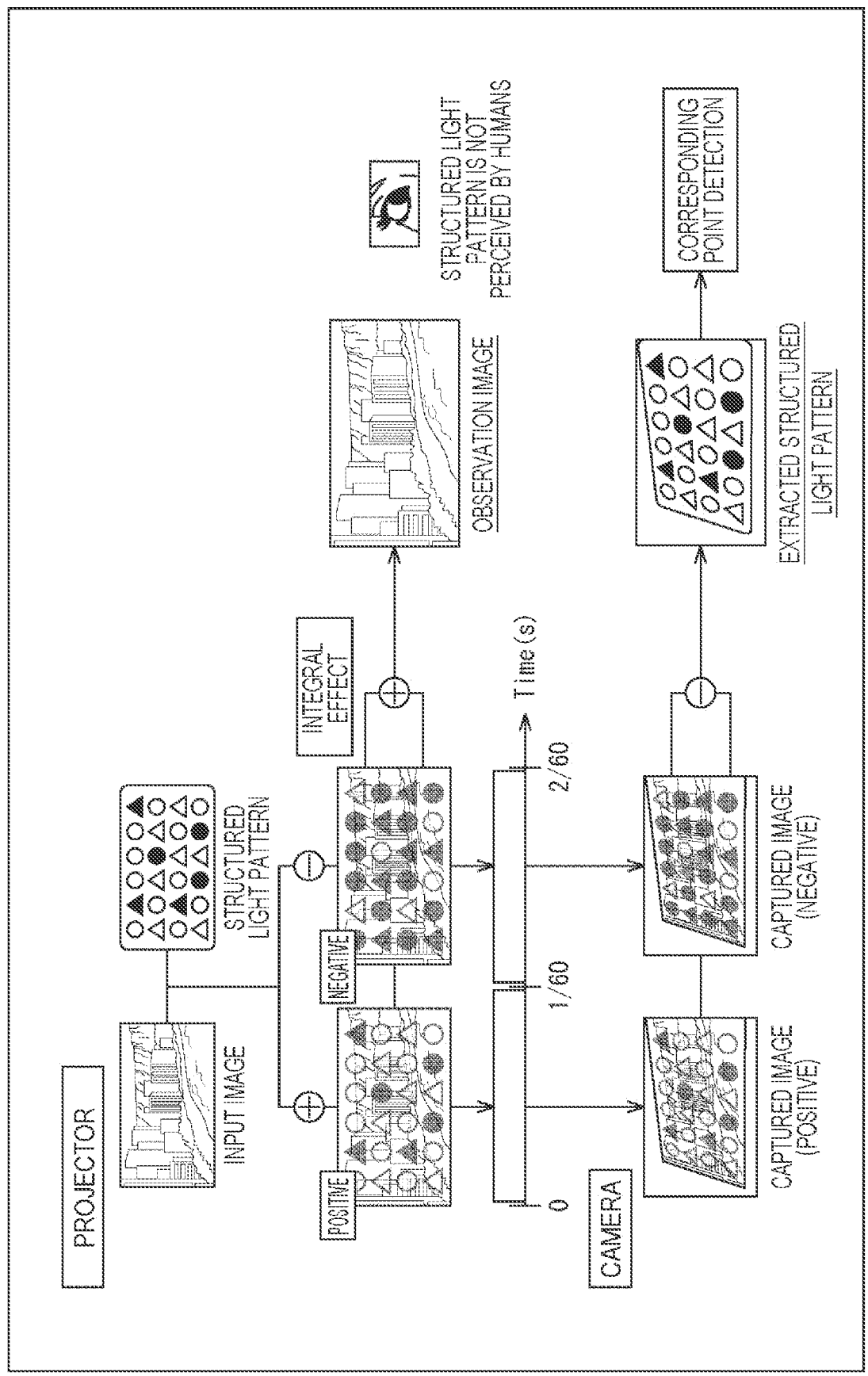
FIG. 8 is a diagram illustrating an example of an ISL method.

FIG. 8 is a diagram illustrating the principle of an imperceptible structured light (ISL) method used in the projector camera system.

The ISL method is a method in which a predetermined structured light pattern is positively and negatively reversed, embedded in a projection image, and projected so as not to be perceived by humans. As an input to the projector 1, for example, an image of content to be actually viewed by the user is used.

As illustrated in FIG. 8, in the projector 1, by adding a structured light pattern to a certain frame of an input image, a frame image of the input image combined with a positive image of the structured light pattern is generated. In addition, by subtracting the structured light pattern from the next frame of the input image, a frame image of the input image combined with a negative image of the structured light pattern is generated.

The projector 1 projects those frame images consecutively. The two positive and negative frames switched at a high speed are added together and perceived by human eyes due to an integral effect. As a result, it is difficult for the user viewing the projection image to recognize the structured light pattern embedded in the input image.

On the other hand, at the camera 2, the projection image consisting of those frame images is captured, and by determining the difference between the two frames of the captured image, the structured light pattern combined with the captured image is extracted. In addition, measurement such as corresponding point detection is performed using the extracted structured light pattern.

Figure 9:
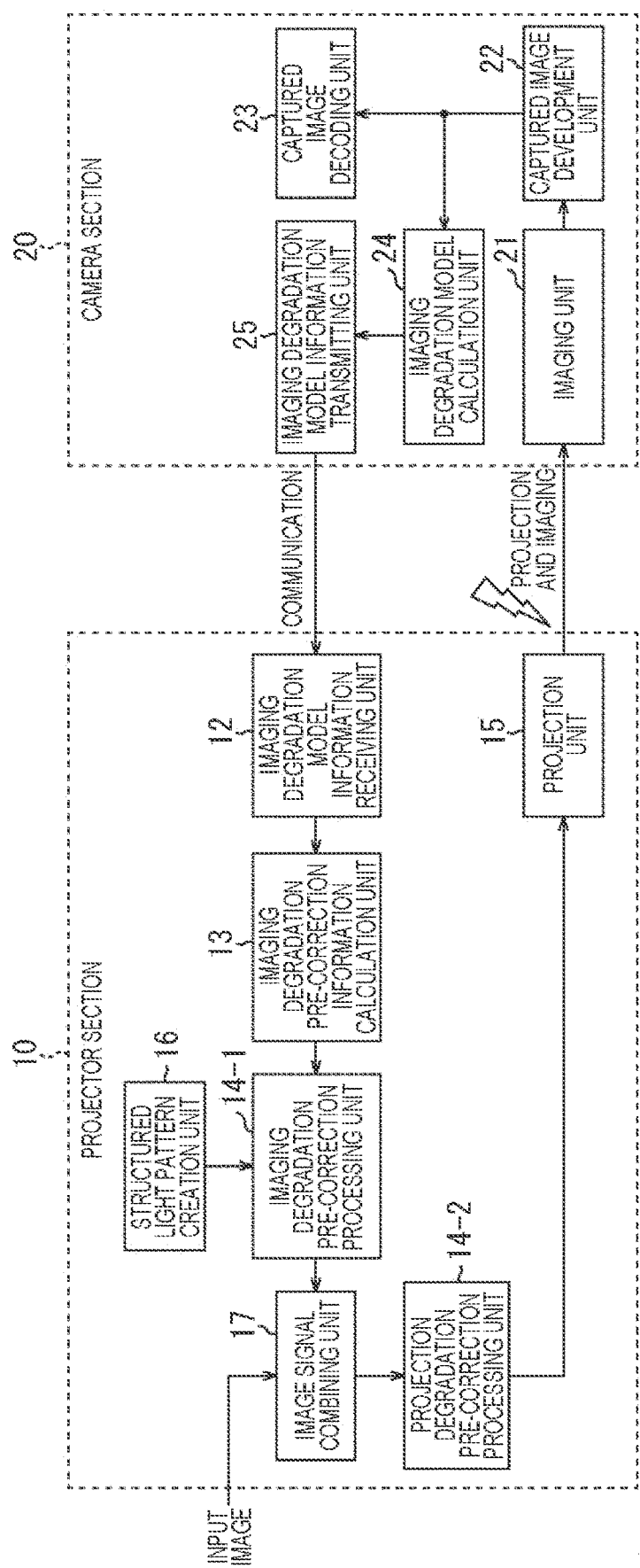
FIG. 9 is a block diagram illustrating a configuration example of the projector camera system using the ISL method.

FIG. 9 is a block diagram illustrating a configuration example of the projector camera system using the ISL method.

The configuration of the projector system illustrated in FIG. 9 is different from the configuration of the projector camera illustrated in FIG. 3 in that a structured light pattern creation unit 16 and an image signal combining unit 17 are provided instead of the test pattern creation unit 11. The image signal combining unit 17 is provided between the imaging degradation pre-correction processing unit 14-1 and the projection degradation pre-correction processing unit 14-2. Explanation repeating the above explanation will be omitted as appropriate.

The projector system in FIG. 9 performs the pre-correction processing, basically satisfying the following three conditions.

Condition 1: The inverse correction of the imaging degradation model B is not applied to an input image.

Condition 2: Only the inverse correction of the projection degradation model A is applied to an input image.

Condition 3: The inverse correction of both the projection degradation model A and the imaging degradation model B is applied to a structured light pattern.

The structured light pattern creation unit 16 creates an image signal of a structured light pattern to be combined with an input image, and outputs it to the imaging degradation pre-correction processing unit 14-1.

The imaging degradation pre-correction processing unit 14-1 generates an image signal obtained by applying the inverse correction of the imaging degradation model B provided from the imaging degradation pre-correction information calculation unit 13 to the image signal of the structured light pattern provided from the structured light pattern creation unit 16. The inverse correction of the imaging degradation model B is applied to the structured light pattern. The image signal generated by the application of the inverse correction of the imaging degradation model B is provided to the image signal combining unit 17.

The image signal combining unit 17 combines the image signal of the structured light pattern provided from the imaging degradation pre-correction processing unit 14-1 with the input image to create an image signal X. The combining by the image signal combining unit 17 is performed by combining a positive image and a negative image of the structured light pattern alternately with individual consecutive frames constituting the input image.

The image signal X can be expressed by the following equation (13) in which the input image I and the structured light pattern ±S are combined. "±" of the structured light pattern ±S represents a negative and a positive of the structured light pattern.

[Equation 13]

$$X = I \pm S \tag{13}$$

The image signal combining unit 17 applies the inverse correction of the imaging degradation model B only to structured pattern components to create the image signal X combined with the input image I. The image signal X representing the input image combined with the structured light pattern, created by the image signal combining unit 17 is provided to the projection degradation pre-correction processing unit 14-2.

The projection degradation pre-correction processing unit 14-2 generates an image signal X' obtained by applying the inverse correction of the projection degradation model A of the projector 1 itself to the image signal X provided from the image signal combining unit 17. The image signal X' can be expressed by the following equation (14).

[Equation 14]

$$X' = A^{-1} \cdot (I \pm B^{-1} \cdot S) \tag{14}$$

Thus, the imaging degradation pre-correction processing is not performed on the entire projection image, but is performed only on structured light pattern components. On the other hand, the projection degradation pre-correction processing is performed on both input image components and structured light pattern components.

Projection based on the image signal X' is performed by the projector 1, and a projection image Y' is projected on the screen 3.

From the above equation (1), the projection image Y' can be expressed by the following equation (15).

[Equation 15]

$$\begin{aligned} Y' &= A \cdot (A^{-1} \cdot (I \pm B^{-1} \cdot S)) \\ &= A \cdot A^{-1} \cdot I \pm A \cdot A^{-1} \cdot B^{-1} \cdot S \\ &= I \pm B^{-1} \cdot S \end{aligned} \tag{15}$$

Only the input image I is perceived by human eyes due to the effect of time integration, which is not affected by the imaging degradation model B of the camera 2 (inverse correction $B^{-1}$).

In the imaging unit 21 of the camera 2, the projection image Y' is captured. A captured image Z' is acquired by the processing of the captured image development unit 22.

From the above equation (2), the captured image Z' acquired by the camera 2 can be expressed by the following equation (16).

[Equation 16]

$$Z' = B \cdot A \cdot (A^{-1} \cdot (I \pm B^{-1} \cdot S)) \quad (16)$$
$$= B \cdot A \cdot A^{-1} \cdot I \pm B \cdot A \cdot A^{-1} \cdot B^{-1} \cdot S$$
$$= B \cdot I \pm S$$

Equation (16) represents that by determining the difference in the captured image Z' in the time direction, only the structured light pattern ±S can be extracted.

Thus, the pre-correction processing to compensate both the projection degradation model A and the imaging degradation model B in advance at the projector 1 can also be applied to the projector camera system that projects a structured light pattern by the ISL method.

<Modification of Configuration Using ISL Method>

The structured light pattern ±S in the projection image Y' may be perceived due to a deviation of the linearity of the projector 1, the limitation of signal amplitude, a deviation of the time integration characteristics of eyes, or the like. The pre-correction (inverse correction) processing in this case is generally processing to emphasize signal components, and thus increases the possibility that the structured light pattern ±S is perceived.

A parameter to be used to adjust the intensity of the imaging degradation pre-correction processing may be set, and the value of the parameter may be controlled depending on the degree of perception of the structured light pattern ±S.

In this case, the projection degradation pre-correction processing unit 14-2 in FIG. 9 adjusts the intensity of the imaging degradation pre-correction processing according to a parameter a, to keep it lower than or equal to a detection limit. An image signal X' can be expressed by the following equation (17) using an identity matrix E.

[Equation 17]

$$X' = A^{-1} \cdot (I \pm (\alpha \cdot B^{-1} + (1-\alpha) \cdot E) \cdot S) \quad (17)$$

Projection can be performed on the basis of this image signal X'.

A projection image Y" projected on the screen 3 can be expressed by the following equation (18-1). A captured image Z" acquired by the camera 2 that captures the projection image Y" can be expressed by the following equation (18-2).

[Equations 18]

$$Y'' = I \pm (\alpha \cdot B^{-1} + (1-\alpha) \cdot E) \cdot S \quad (18\text{-}1)$$

$$Z'' = B \cdot I \pm (\alpha \cdot E + )1-\alpha) \cdot B) \cdot S \quad (18\text{-}2)$$

This can ensure as much correction as possible on the structured light pattern components contained in the captured image while reducing the possibility that the structured light pattern ±S is perceived.

Note that when parameter a =1 in equation (17), the same result as in equation (14) is obtained. Furthermore, when parameter α=0, the same result as when the imaging degradation pre-correction processing is not performed is obtained.

<<Modification>>
<Another configuration example>

At least part of the configuration of the projector section 10 may be implemented in an apparatus such as a PC external to the projector 1.

Figure 10:
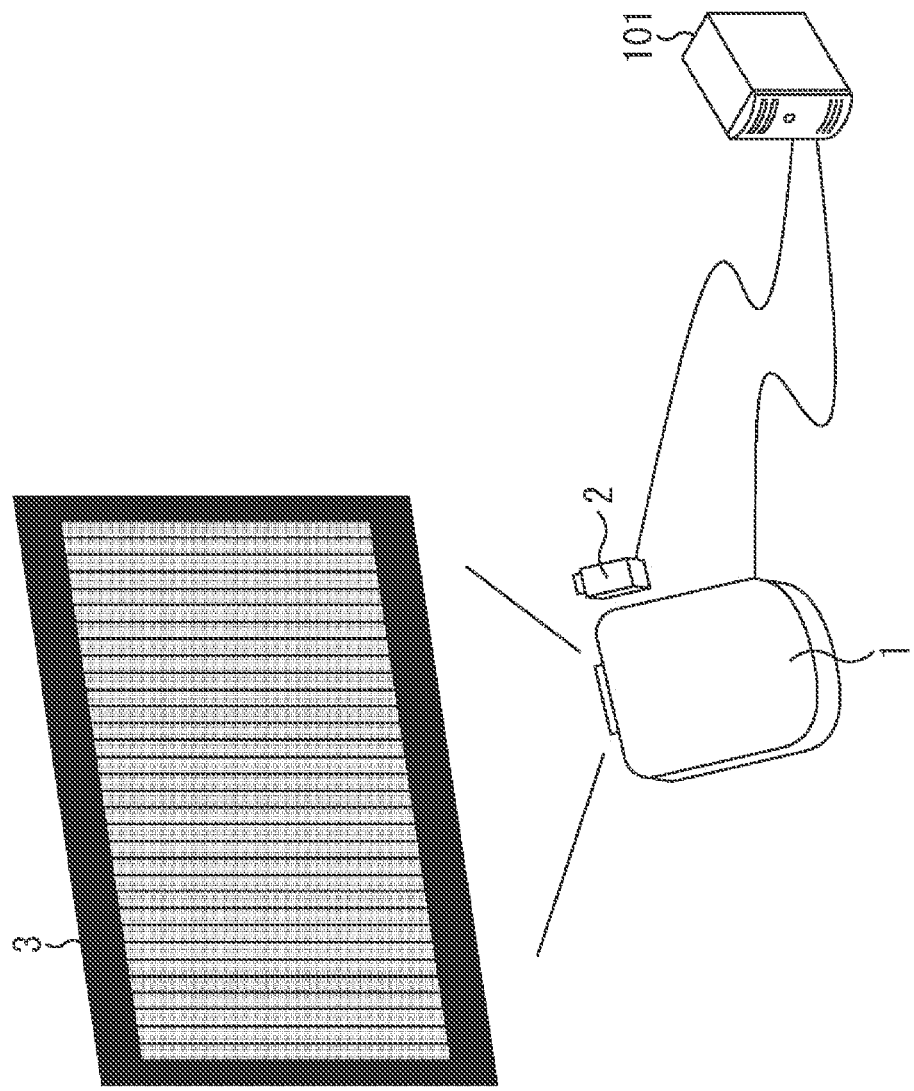
FIG. 10 is a diagram illustrating another configuration example of the projector camera system.

FIG. 10 is a diagram illustrating another configuration example of the projector camera system.

The projector camera system in FIG. 10 includes the projector 1 and the camera 2 connected to an information processing apparatus 101 such as a PC.

The information processing apparatus 101 implements, for example, the components other than the projection unit 15 of the components of the projector section 10 illustrated in FIG. 3. Of the components of the camera section 20, the components other than the imaging unit 21 may be implemented by the information processing apparatus 101.

The imaging degradation model B, which is calculated from a captured image in the imaging degradation model calculation unit 24 of the camera 2, may alternatively be set by using values determined by simulation, by adjustment to make decoding results the most beautiful, or the like.

The above-described technology can be applied not only to the projector 1 but also to a system using another display device such as a flat-panel display or a head-mounted display.

The above-described technology can also be applied not only to the camera 2 but also to a system using another sensor device capable of acquiring a captured image Z' corresponding to a test pattern image X, such as a time-of-flight (ToF) sensor or a LIDAR.

The screen 3 can use, instead of a planar projection surface, a projection surface formed of a surface other than a plane such as a curved surface.

<Configuration Example of Computer>

The above-described series of processing steps may be executed by hardware, or may be executed by software. In a case where the series of processing steps is executed by software, a program constituting the software is installed from a program recording medium onto a computer incorporated in dedicated hardware, a general-purpose personal computer, or the like.

Figure 11:
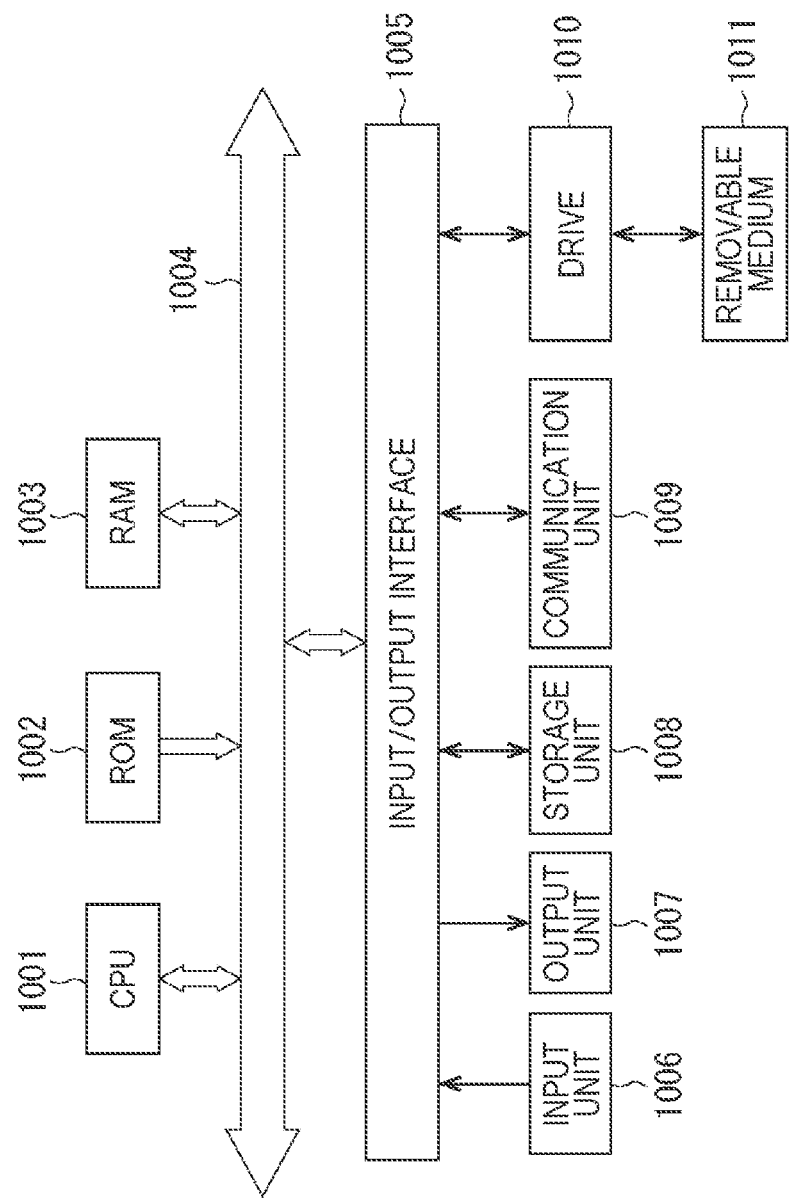
FIG. 11 is a block diagram illustrating a configuration example of a computer.

FIG. 11 is a block diagram illustrating a hardware configuration example of a computer that executes the above-described series of processing steps using a program.

A central processing unit (CPU) 1001, a read-only memory (ROM) 1002, and a random-access memory (RAM) 1003 are mutually connected by a bus 1004.

An input/output interface 1005 is further connected to the bus 1004. An input unit 1006 including a keyboard, a mouse, etc. and an output unit 1007 including a display, a speaker, etc. are connected to the input/output interface 1005. Furthermore, a storage unit 1008 including a hard disk, a nonvolatile memory, etc., a communication unit 1009 including a network interface etc., and a drive 1010 that drives a removable medium 1011 are connected to the input/output interface 1005.

In the computer configured as described above, the CPU 1001 loads a program stored in the storage unit 1008, for example, into the RAM 1003 via the input/output interface 1005 and the bus 1004, and executes it, thereby performing the above-described series of processing steps.

The program executed by the CPU 1001 is provided, for example, by being recorded in the removable medium 1011 or via a wired or wireless transmission medium such as a local area network, the Internet, or digital broadcasting, and is installed in the storage unit 1008.

Note that the program executed by the computer may be a program under which processing is performed in time series in the order described in the present description, or may be a program under which processing is performed in parallel or at a necessary timing such as when a call is made.

In the present description, a system means a set of a plurality of components (apparatuses, modules (parts), etc.). It does not matter whether or not all the components are in the same housing. Thus, a plurality of apparatuses housed in separate housings and connected via a network, and a single apparatus with a plurality of modules housed in a single housing are both systems.

The effects described in the present description are merely examples and nonlimiting, and other effects may be included.

Embodiments of the present technology are not limited to the above-described embodiment, and various changes may be made without departing from the scope of the present technology.

For example, the present technology may have a configuration of cloud computing in which one function is shared by a plurality of apparatuses via a network and processed in cooperation.

Furthermore, each step described in the above-described flowcharts, which is executed by a single apparatus, may alternatively be shared and executed by a plurality of apparatuses.

Moreover, in a case where a plurality of processing steps is included in a single step, the plurality of processing steps included in the single step may be shared and executed by a plurality of apparatuses instead of being executed by a single apparatus.

<Configuration Combination Examples>

The present technology can have the following configurations.

(1)

An image processing apparatus including:

a correction processing unit that performs, on a test pattern image representing a predetermined test pattern, correction processing according to an imaging degradation model obtained by modeling degradation occurring during capturing of the test pattern image projected on a screen, and correction processing according to a projection degradation model obtained by modeling degradation occurring during projection of the test pattern image.

(2)

The image processing apparatus according to (1) above, further including:

a projection unit that projects, on the screen, the test pattern image that has undergone the correction processing according to the projection degradation model.

(3)

The image processing apparatus according to (1) or (2) above, further including:

an acquisition unit that acquires information regarding the imaging degradation model from a camera that captures the test pattern image projected on the screen.

(4)

The image processing apparatus according to (3) above, in which the acquisition unit performs communication with the camera, and receives and acquires the information regarding the imaging degradation model transmitted from the camera.

(5)

The image processing apparatus according to (3) or (4) above, in which the camera performs calculation of the imaging degradation model on the basis of conditions during the capturing of the test pattern image.

(6)

The image processing apparatus according to any one of (3) to (5) above, further including:

a calculation unit that calculates parameters representing content of inverse correction to cancel out the degradation during the imaging occurring in the test pattern image, on the basis of the information regarding the imaging degradation model, in which the correction processing unit performs the correction processing according to the imaging degradation model, on the basis of the parameters.

(7)

The image processing apparatus according to any one of (1) to (6) above, in which the correction processing unit performs, on the test pattern image, correction processing according to a plurality of the imaging degradation models obtained by modeling degradation occurring during capturing of the test pattern image by each of a plurality of cameras, and the projection degradation model.

(8)

The image processing apparatus according to (7) above, further including:

an acquisition unit that acquires information regarding the imaging degradation model from each of the plurality of cameras that captures the test pattern image projected on the screen.

(9)

The image processing apparatus according to (7) or (8) above, further including:

a calculation unit that calculates parameters representing content of the correction processing, on the basis of an error between each of a plurality of captured images obtained by capturing the test pattern image by the plurality of cameras and the test pattern image before undergoing the correction processing, in which the correction processing unit performs the correction processing according to the plurality of imaging degradation models and the projection degradation model, on the basis of the parameters.

(10)

The image processing apparatus according to (9) above, in which the calculation unit calculates the parameters to minimize the sum of a plurality of the errors.

(11)

An image processing method including:

by an image processing apparatus, performing, on a test pattern image representing a predetermined test pattern, correction processing according to an imaging degradation model obtained by modeling degradation occurring during capturing of the test pattern image projected on a screen, and correction processing according to a projection degradation model obtained by modeling degradation occurring during projection of the test pattern image.

(12)

A program that causes a computer to execute processing including:

performing, on a test pattern image representing a predetermined test pattern, correction processing according to an imaging degradation model obtained by modeling degradation occurring during capturing of the test pattern image projected on a screen, and correction processing according to a projection degradation model obtained by modeling degradation occurring during projection of the test pattern image.

(13)

An image processing apparatus including:

a first correction processing unit that performs, on a structured light pattern image representing a structured light pattern to be combined with an input image, correction processing according to an imaging degradation model obtained by modeling degradation occurring during capturing of the input image projected on a screen;

a combining unit that generates the input image combined with the structured light pattern image by alternately combining a positive image and a negative image of the structured light pattern image that has undergone the correction processing according to the imaging degradation model, with individual consecutive frames constituting the input image; and a second correction processing unit that performs, on the input image combined with the structured light pattern image, correction processing according to a projection degradation model obtained by modeling degradation occurring during projection of the input image.

(14)

The image processing apparatus according to (13) above, further including:

a creation unit that creates the structured light pattern image.

(15)

The image processing apparatus according to (13) or (14) above, further including:

a projection unit that projects, on the screen, the input image that has undergone the correction processing according to the projection degradation model.

(16)

The image processing apparatus according to any one of (13) to (15) above, further including:

an acquisition unit that acquires information regarding the imaging degradation model from a camera that captures the input image projected on the screen.

(17)

The image processing apparatus according to any one of (13) to (16) above, in which the first correction processing unit adjusts intensity of the correction processing to be performed on the structured light pattern image, according to a degree of perception of the structured light pattern in the input image projected on the screen.

(18)

An image processing method including:

by an image processing apparatus, performing, on a structured light pattern image representing a structured light pattern to be combined with an input image, correction processing according to an imaging degradation model obtained by modeling degradation occurring during capturing of the input image projected on a screen;

generating the input image combined with the structured light pattern image by alternately combining a positive image and a negative image of the structured light pattern image that has undergone the correction processing according to the imaging degradation model, with individual consecutive frames constituting the input image; and performing, on the input image combined with the structured light pattern image, correction processing according to a projection degradation model obtained by modeling degradation occurring during projection of the input image.

(19)

A program that causes a computer to execute processing including:

performing, on a structured light pattern image representing a structured light pattern to be combined with an input image, correction processing according to an imaging degradation model obtained by modeling degradation occurring during capturing of the input image projected on a screen;

generating the input image combined with the structured light pattern image by alternately combining a positive image and a negative image of the structured light pattern image that has undergone the correction processing according to the imaging degradation model, with individual consecutive frames constituting the input image; and performing, on the input image combined with the structured light pattern image, correction processing according to a projection degradation model obtained by modeling degradation occurring during projection of the input image.

REFERENCE SIGNS LIST

1 Projector
2 Camera
3 Screen
10 Projector section
11 Test pattern creation unit
12 Imaging degradation model information receiving unit
13 Imaging degradation pre-correction information calculation unit
14 Degradation pre-correction processing unit
14-1 Imaging degradation pre-correction processing unit
14-2 Projection degradation pre-correction processing unit
15 Projection unit
16 Structured light pattern creation unit
17 Image signal combining unit
20 Camera section
21 Imaging unit
22 Captured image development unit
23 Captured image decoding unit
24 Imaging degradation model calculation unit
25 Imaging degradation model information transmitting unit
101 Information processing apparatus

The invention claimed is:

1. An image processing apparatus comprising:
a correction processing unit that performs, on a test pattern image representing a predetermined test pattern, correction processing according to an imaging degradation model obtained by modeling degradation occurring during capturing of the test pattern image projected on a screen, and correction processing according to a projection degradation model obtained by modeling degradation occurring during projection of the test pattern image.

2. The image processing apparatus according to claim 1, further comprising:
a projection unit that projects, on the screen, the test pattern image that has undergone the correction processing according to the projection degradation model.

3. The image processing apparatus according to claim 1, further comprising:
an acquisition unit that acquires information regarding the imaging degradation model from a camera that captures the test pattern image projected on the screen.

4. The image processing apparatus according to claim 3, wherein
the acquisition unit performs communication with the camera, and receives and acquires the information regarding the imaging degradation model transmitted from the camera.

5. The image processing apparatus according to claim 3, wherein
the camera performs calculation of the imaging degradation model on a basis of conditions during the capturing of the test pattern image.

6. The image processing apparatus according to claim 3, further comprising:
a calculation unit that calculates parameters representing content of inverse correction to cancel out the degradation during the imaging occurring in the test pattern image, on a basis of the information regarding the imaging degradation model,
wherein the correction processing unit performs the correction processing according to the imaging degradation model, on a basis of the parameters.

7. The image processing apparatus according to claim 1, wherein
the correction processing unit performs, on the test pattern image, correction processing according to a plurality of the imaging degradation models obtained by modeling degradation occurring during capturing of the test pattern image by each of a plurality of cameras, and the projection degradation model.

8. The image processing apparatus according to claim 7, further comprising:
an acquisition unit that acquires information regarding the imaging degradation model from each of the plurality of cameras that captures the test pattern image projected on the screen.

9. The image processing apparatus according to claim 8, further comprising:
a calculation unit that calculates parameters representing content of the correction processing, on a basis of an error between each of a plurality of captured images obtained by capturing the test pattern image by the plurality of cameras and the test pattern image before undergoing the correction processing,
wherein the correction processing unit performs the correction processing according to the plurality of imaging degradation models and the projection degradation model, on a basis of the parameters.

10. The image processing apparatus according to claim 9, wherein
the calculation unit calculates the parameters to minimize a sum of a plurality of the errors.

11. An image processing method comprising:
by an image processing apparatus,
performing, on a test pattern image representing a predetermined test pattern, correction processing according to an imaging degradation model obtained by modeling degradation occurring during capturing of the test pattern image projected on a screen, and correction processing according to a projection degradation model obtained by modeling degradation occurring during projection of the test pattern image.

12. A non-transitory computer readable medium that causes a computer to
execute processing comprising:
performing, on a test pattern image representing a predetermined test pattern, correction processing according to an imaging degradation model obtained by modeling degradation occurring during capturing of the test pattern image projected on a screen, and correction processing according to a projection degradation model obtained by modeling degradation occurring during projection of the test pattern image.

13. An image processing apparatus comprising:
a first correction processing unit that performs, on a structured light pattern image representing a structured light pattern to be combined with an input image, correction processing according to an imaging degradation model obtained by modeling degradation occurring during capturing of the input image projected on a screen;
a combining unit that generates the input image combined with the structured light pattern image by alternately combining a positive image and a negative image of the structured light pattern image that has undergone the correction processing according to the imaging degradation model, with individual consecutive frames constituting the input image; and
a second correction processing unit that performs, on the input image combined with the structured light pattern image, correction processing according to a projection degradation model obtained by modeling degradation occurring during projection of the input image.

14. The image processing apparatus according to claim 13, further comprising:
a creation unit that creates the structured light pattern image.

15. The image processing apparatus according to claim 13, further comprising:
a projection unit that projects, on the screen, the input image that has undergone the correction processing according to the projection degradation model.

16. The image processing apparatus according to claim 13, further comprising:
an acquisition unit that acquires information regarding the imaging degradation model from a camera that captures the input image projected on the screen.

17. The image processing apparatus according to claim 13, wherein
the first correction processing unit adjusts intensity of the correction processing to be performed on the structured light pattern image, according to a degree of perception of the structured light pattern in the input image projected on the screen.

18. An image processing method comprising:
by an image processing apparatus,
performing, on a structured light pattern image representing a structured light pattern to be combined with an input image, correction processing according to an imaging degradation model obtained by modeling degradation occurring during capturing of the input image projected on a screen;
generating the input image combined with the structured light pattern image by alternately combining a positive image and a negative image of the structured light pattern image that has undergone the correction processing according to the imaging degradation model, with individual consecutive frames constituting the input image; and
performing, on the input image combined with the structured light pattern image, correction processing according to a projection degradation model obtained by modeling degradation occurring during projection of the input image.

19. A non-transitory computer readable medium that causes a computer to
execute processing comprising:
performing, on a structured light pattern image representing a structured light pattern to be combined with an input image, correction processing according to an imaging degradation model obtained by modeling degradation occurring during capturing of the input image projected on a screen;

generating the input image combined with the structured light pattern image by alternately combining a positive image and a negative image of the structured light pattern image that has undergone the correction processing according to the imaging degradation model, with individual consecutive frames constituting the input image; and performing, on the input image combined with the structured light pattern image, correction processing according to a projection degradation model obtained by modeling degradation occurring during projection of the input image.

* * * * *